(12) United States Patent
Iyer et al.

(10) Patent No.: US 10,296,701 B1
(45) Date of Patent: May 21, 2019

(54) RETIMING WITH FIXED POWER-UP STATES

(71) Applicant: ALTERA CORPORATION, San Jose, CA (US)

(72) Inventors: Mahesh A. Iyer, Freemont, CA (US); Vasudeva M. Kamath, San Jose, CA (US); Robert Lawrence Walker, Boulder, CO (US)

(73) Assignee: Altera Corporation, San Jose, CA (US)

( * ) Notice: Subject to any disclaimer, the term of this patent is extended or adjusted under 35 U.S.C. 154(b) by 161 days.

(21) Appl. No.: 15/195,837

(22) Filed: Jun. 28, 2016

(51) Int. Cl.
*G06F 17/50* (2006.01)
(52) U.S. Cl.
CPC ...... *G06F 17/5081* (2013.01); *G06F 17/5027* (2013.01); *G06F 17/5031* (2013.01)
(58) Field of Classification Search
CPC ............. G06F 17/5081; G06F 17/5031; G06F 17/5027
See application file for complete search history.

(56) References Cited

U.S. PATENT DOCUMENTS 7,120,883 B1 * 10/2006 van Antwerpen .. G06F 17/5045
716/102

* cited by examiner

*Primary Examiner* — Vuthe Siek
(74) *Attorney, Agent, or Firm* — Fletcher Yoder, P.C.

(57) ABSTRACT

A computer-implemented method includes performing retiming using a circuit design to determine a retimed variation to the circuit design. The circuit design includes a first set of registers with defined power-up states and the variations each comprise a second set of registers that correspond to the first set of registers. The method includes maintaining fixed power-up states for the second set of registers in the variations. The fixed power-up states for the second set of registers are equivalent to the defined power-up states of the first set of registers. The method includes identifying registers of the second set of registers involved in an initial state conflict, and performing a mitigating action to resolve the initial state conflict to enable retiming to continue while maintaining functionally equivalent behavior as the circuit design. Various choices of initial states are also explored during retiming to increase the effect of retiming.

20 Claims, 7 Drawing Sheets

RETIMING WITH FIXED POWER-UP STATES

BACKGROUND

The present disclosure relates generally to integrated circuits (ICs), which may include programmable logic devices (PLDs) such as field programmable gate arrays (FPGAs). More particularly, the present disclosure relates to improving circuit performance using retiming with fixed power-up states for registers, among other things.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, programmable logic devices (PLDs) such as field programmable gate arrays (FPGAs) are ICs that may be highly flexible devices. FPGAs include logic that may be programmed after manufacturing to provide functionality that the FPGA may be designed to support. Thus, FPGAs contain programmable logic, or combinational logic blocks, that may perform a variety of functions on the FPGAs, according to a circuit design of a user. In a programmable logic circuit design, groups of combinational logic elements may be separated by registers. At each clock cycle, a data signal may exit one register, be processed through a first group of combinational logic elements, and enter another register to wait for the next clock cycle to begin. At the next clock cycle, the data signal may continue through a second group of combinational logic elements into a third register, and so forth. Thus, the way that the registers separate different groups of combinational logic elements may have a substantial impact on the maximum achievable clock signal frequency by which the data signal may pass through the programmable logic circuit design. The maximum clock signal frequency may depend on how quickly the data signal can pass through a group of combinational logic elements between any two registers of the circuit design.

One technique to improve the performance of the circuit design is through register retiming, which involves adjusting the placement of the registers across different groups of combinational logic elements to improve a maximum achievable clock signal frequency. However, the benefits of retiming are often limited due to the use of certain constructs in circuit designs that inadvertently inhibit retiming. Such restrictions might include user directives intended for other purposes but that also limit retiming; the use of certain hardware features, such as asynchronous clears, that might be incompatible with retiming on some architectures; or even simply the lack of sufficient available registers for retiming. Some computer aided design (CAD) tools are being developed that can remove these restrictions or add registers to demonstrate the performance potential of retiming with changes to the circuit design of the user. In general, retimed circuits do not exhibit the same sequential behavior as the original circuit. The difference in sequential behavior may occur only when the retimed circuit powers up in certain initial states. To circumvent this issue, certain IC architectures provide a mechanism to ensure that all registers power-up in known initial states. The CAD tools for retiming then compute new power-up initial states for the retimed registers to ensure functional equivalence with the original circuit design.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to devices, software programs, and methods, for improving the performance of an initial circuit design using retiming on the initial circuit design with fixed power-up states for certain registers, particularly when there are conflicting initial states between a varied circuit design and the initial circuit design. For example, all of the registers may power-up deterministically in a logical 0 state. Further, in some embodiments, the retimer may duplicate certain combinational logic elements, such as look-up tables, and/or add certain combinational logic elements, such as inverters, during retiming to maintain functional behavior and the fixed initial states of the initial circuit design. In other embodiments, the retimer may also evaluate several possible legal initial states during backward retiming to maximize the potential of retiming and improve circuit performance. Using the disclosed techniques may enable retiming to compute and maintain fixed initial states across combinational logic and fanout branches (e.g., where a single node splits into two or more datapaths) in a circuit design.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
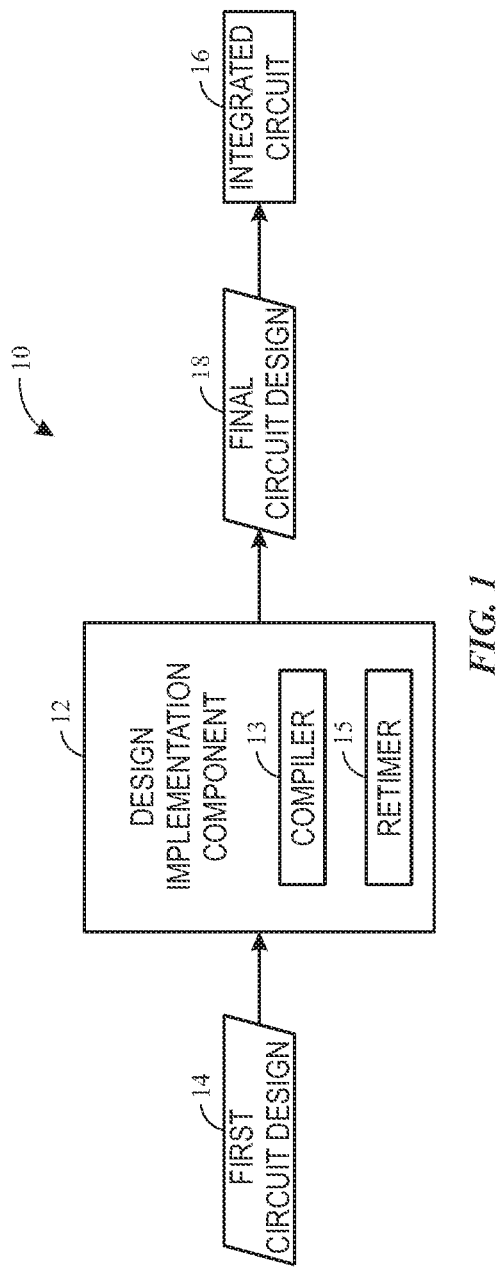
FIG. 1 illustrates a block diagram of a system that utilizes a design and implementation component to perform compilation with retiming to improve the performance of a circuit design, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementations-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A retimer may generate one or more variations to an initial circuit design by structurally repositioning registers (e.g., flip-flops) across combinational logic elements to improve performance. The retimer may retime the variations of the circuit design to make the circuit design more performance efficient or balanced. As may be appreciated, the overall performance of the clock signal is dictated by combinational logic elements between the registers and/or input-outputs (IOs) that have the longest delay. A critical path typically refers to the combinational logic elements, registers, and/or IOs that are included in the path in the circuit with the longest delay. Thus, one general goal of retiming is reducing the longest delay of the critical path by rearranging registers across the combinational logic elements to balance delays for various paths in the circuit design. There are various types of retiming, such as minimum-period retiming that may achieve the shortest delay for a clock period, minimum-area retiming that may achieve the shortest delay for an area of the circuit design, and constrained minimum-area retiming that may satisfy user-specified clock constraints with a minimum number of flip-flops.

The retimer may also compute new initial power-up states for all registers in the retimed circuit using the initial states of the initial circuit design and boolean function of the combinational elements to ensure functional equivalence of the retimed circuit variations and the initial circuit design. Thus, retiming may refer to a technique that enables the clock signal to run faster while still preserving correctness of the circuit design. However, the initial states of the retimed circuit may result in circuit structures that prevent further retiming because conflicting initial state values prevent the computation of new initial states after such retiming. For example, some architectures of integrated circuits dictate that the power-up states of registers be fixed (i.e., begin at the same state each time the circuit is powered up). Thus, retiming may fail when a register is moved across an inverter because the fixed power-up state does not produce the same output state after inversion. That is, initial states of the retimed circuit design may produce values in the circuit that conflict with the corresponding values produced by the initial states of the initial circuit design, thereby limiting certain retiming moves. In particular, retiming registers backwards on fanout branches with inverters may result in conflicting initial states.

Accordingly, some embodiments of the present disclosure relate generally to circuitry and/or processor-executable, machine-readable instructions stored on a tangible, non-transitory, machine-readable medium for retiming with fixed power-up states by duplicating and/or adding logic that overcomes the initial states conflicts in a retimed circuit design. In some embodiments, an initial state conflict may refer to an initial output state of a varied circuit design differing from an initial output state of a first circuit design. These conflicts in initial states may prevent retiming moves, thereby reducing circuit performance. The initial states conflicts may be overcome by using flip-flops that can power-up deterministically in a logical 0 state and performing a mitigating action (e.g., duplicating logic in the circuit design, combining logic in the circuit design, and/or adding logic in the circuit design). In particular, the disclosed embodiments may maintain functionally equivalent circuit behavior and preserve the fixed power-up states dictated by some integrated circuit architectures while resolving the initial states conflicts and improving the circuit performance. In addition, some embodiments may perform costing analysis between several possible combinations of logic elements and registers during retiming moves to determine which logic elements and registers can be merged (e.g., onto a fanout stem) to enable further retiming (e.g., without logic duplication). It should be appreciated that the embodiments of the present disclosure may be implemented as instructions executed in a processor and/or hardware logic (e.g., an application-specific integrated circuit (ASIC) or a programmable logic device (PLD) such as a field programmable gate array (FPGA)).

With the foregoing in mind, FIG. 1 illustrates a block diagram of a system 10 that utilizes a design and implementation component 12 to perform compilation 13 with retiming 15 to improve the performance of a circuit design to program an integrated circuit 16. The design implementation component 12 may represent a CAD optimization tool that may execute on a processor and be stored in a tangible, non-transitory machine-readable medium (e.g., a memory).

The design implementation component 12 may include one or more components such as a compiler 13 and a retimer 15 that may perform compilation and retiming in concert with one another. For example, as will be discussed further below, the retimer 15 may retime the circuit design at various stages of compilation by the compiler 13. The design implementation component 12 may receive a first circuit design 14. The first circuit design 14 may represent a designer's original circuit design source code written in a high-level programming language. The retimer 15 may accept the first circuit design 14 as input and determine variations including circuit design changes to the first circuit design 14. The retimer 15 may also retime the first circuit design 14 and the variations to improve performance.

In some embodiments, the circuit design changes made in the variations of the first circuit design 14 may be made in an attempt to maximize the performance of the clock signals feeding the first circuit design 14. Embodiments of the present disclosure are automatic and may not entail user intervention. That is, in some embodiments, conflicts in initial states computation during retiming the first circuit design 14 are automatically detected by the retimer 15 and addressed through automatic driver logic duplication. Similarly, several possible initial states are automatically evaluated by the retimer 15 to increase (e.g., maximize) future possible retiming moves. The circuit design changes made during retiming may include repositioning registers through combinational logic, powering-up certain registers deterministically to certain fixed states (e.g., logical 0's or 1's) and/or modifying the actual circuit by duplicating and/or adding logic to overcome the initial states conflicts.

The retimed variation of the first circuit design 14 that overcomes the initial states conflicts while maintaining functionally equivalent behavior and maximizing performance of the first circuit design 14 is output as a final circuit design 18 to program on the integrated circuit 16. In embodiments where an FPGA is used, the final circuit design 18 may include a bitstream representing the retimed circuit design. In embodiments where an application-specific integrated circuit (ASIC) is used, the final circuit design 18 may include an ASIC design.

Retiming may be performed by the retimer 15 during numerous stages of circuit design. Retiming may use the first circuit design 14 that includes a first set of registers to generate one or more variations that include a second set of registers that correspond to the first set of registers. As described below, in some embodiments, the correspondence between the first set of registers and the second set of registers may be one-to-one, one-to-many, or many-to-one. Further, the first set of registers may have a defined power-up state and the power-up state of the second set of registers may be equivalent to the defined-up power-up states of the corresponding registers of the first set of registers.

Figure 2:
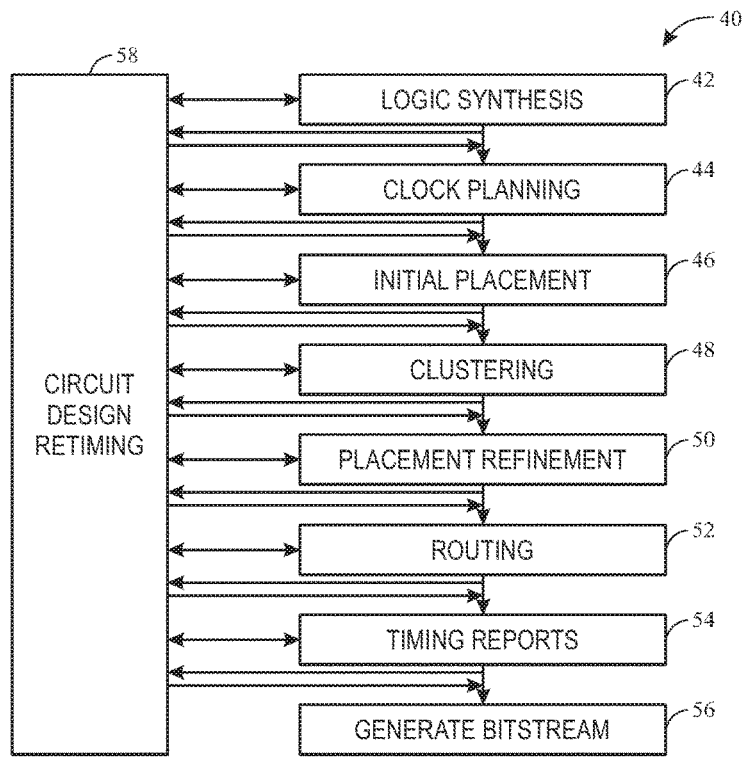
FIG. 2 illustrates a flow diagram of a process suitable for generating a bitstream representative of a register-transfer level (RTL) description where retiming may be performed at each step of the process, in accordance with an embodiment.

FIG. 2 illustrates a flow diagram of a process 40 suitable for generating a bitstream representative of a register-transfer level (RTL) description where retiming may be performed at each step of the process 40, in accordance with an embodiment. The process 40 may be performed using FPGAs or ASICs. The process 40 may affect registers, block random access memories (RAMs), look-up tables (LUTs), and/or digital signal processors (DSPs) when performed on FPGAs. When ASICs are utilized, the process 40 may differ from embodiments tailored for FPGAs in that a bitstream is not generated, clock grouping is not performed, and there is relatively little clustering performed.

The process 40 may be executed by the design implementation component 12 and may include logic synthesis (block 42), clock planning (block 44), initial placement (block 46), clustering (block 48), placement refinement (block 50), routing (block 52), timing reports (block 54), and generating a bitstream (block 56). As depicted, circuit design retiming 58 may be performed at, before, or after any step (blocks 42, 44, 46, 48, 50, 52, 54, and/or 56) to improve the performance of the clock signal fed to the circuit design.

Logic synthesis (block 42) may include creating look-up tables (LUTs), gates, registers (e.g., flip-flops), and the like based on the RTL description provided by the user. As may be appreciated, RTL description is used in hardware description languages like Verilog and Very High Speed Integrated Circuit (VHSIC) Hardware Description Language (VHDL) to create high level representations of a circuit. The RTL description may model the flow of a signal between registers and combinational elements (e.g., logical operators, such as LUTs and/or gates) in a circuit design. Thus, provided with the RTL description, logic synthesis (block 42) may generate the registers and/or combinational logic elements included in the circuit design. Logic synthesis (block 42) also maps the logic to the underlying target FPGA architecture or the underlying technology library in ASIC designs.

Clock planning (block 44) may include allocating clocks to the circuit design. In some instances there may be different clock signal domains that are allocable to the circuit design. For example, one clock signal domain may be named "clk_r" for clock read, another clock signal domain may be named "clk_w" for clock write, and so forth. Initial placement (block 46) may be performed to place allocated resources, such as the registers, combinational elements, digital signal processing (DSP) elements, block RAMS, and the like on a device physical floorplan (e.g., FPGA device floorplan). Clustering (block 48) may be performed to group certain resources together based on the legal physical implementation of the underlying target device architecture, and on certain other factors, such as physical or functional relationship to one another, power consumption, delay, performance, wiring usage, or the like.

Further, placement refinement (block 50) may be performed after clustering is completed to refine overall organization and interaction of the resources to further minimize key design metrics like clock frequency, wiring usage, routing congestion, etc. Also, the compiler may perform routing (block 52) to route all the wires connecting the various registers and combinational logic elements to perform the desired functionality of the circuit design, and realize a legal physical implementation of the circuit design on the underlying target device. The compiler may also perform timing reports (block 54), which includes the performance of the various clock signals of the first circuit design 14 and/or the variations to the first circuit design 14 generated during retiming. Additionally, the design implementation component 12 may generate a bitstream (block 56) to be compiled by the compiler 13. The retimer 15 may perform the circuit design retiming 58 during any of the steps (blocks 42, 44, 46, 48, 50, 52, 54, and/or 56) in the process 40 to improve performance of the circuit design.

Figure 3:
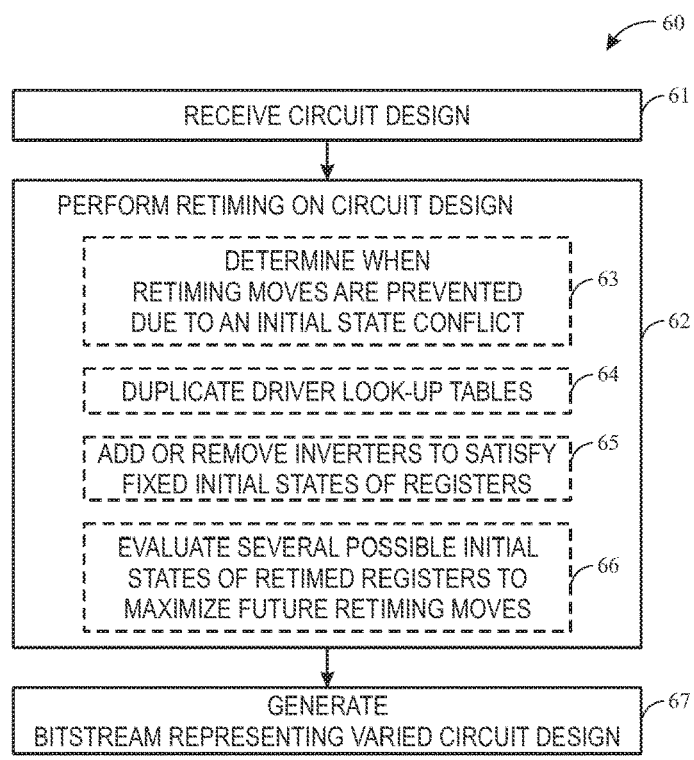
FIG. 3 illustrates a flow diagram of a process suitable for performing retiming on a circuit design while solving any conflicts with initial states between a retimed circuit design and an initial circuit design, and evaluating multiple possible initial states to increase possible future retiming moves, in accordance with an embodiment.

FIG. 3 illustrates a flow diagram of a process 60 suitable for performing retiming on a circuit design that solves conflicts in initial state computation encountered during retiming, and evaluates several possible initial state values to increase (e.g., maximize) future retiming moves, in accordance with an embodiment. The process 60 may be implemented as instructions stored on a tangible, non-transitory machine readable medium and executable by one or more processors. In some embodiments, the process 60 may be executed by the design implementation component 12 (e.g., the retimer 15). Additionally, although the following process 60 describes a number of operations that may be performed, it should be noted that the process 60 may be performed in a variety of suitable orders and all of the operations may not be performed.

The process 60 may include receiving (block 61) the first circuit design 14 (e.g., from a user) and performing (block 62) retiming on the first circuit design 14 using the retimer 15. As discussed above, retiming may reposition registers across combinational elements in the first circuit design 14 to generate one or more variations to the first circuit design 14 in an effort to improve performance of the circuit design.

During retiming, the process 60 may determine (block 63) when retiming moves are prevented due to an initial state conflict. As previously discussed, during retiming, the retimer 15 computes initial states that maintain the functionality of the initial circuit design. This may cause a situation where the initial states of registers computed by the retimer 15 prevent further retiming moves because doing so would cause a conflict and the retimer 15 then cannot determine a valid initial state for the retimed registers. For example, some architectures for integrated circuits may dictate that the registers maintain fixed (remain the same) power-up states during retiming. As such, moving a register with a fixed power-up state (e.g., 0) across an inverter will cause the inverter to output the opposite state (e.g., 1), thereby potentially conflicting with an initial output state of the first circuit design 14. In such cases, the retimer 15 in the present disclosure may continue retiming by duplicating (block 64) combinational logic elements (e.g., driver LUTs), adding or removing (block 65) LUTs functioning as inverters to satisfy the fixed power-up states of the registers (to enable retiming to continue when one or more unsuccessful retiming moves occurs), and/or evaluating several possible initial states of retimed registers to increase (e.g., maximize) future possible retiming moves (block 66).

Duplicating combinational logic elements may be particularly beneficial when there are conflicting initial states of registers on fanout branches after the retimer 15 attempts to move a register across an inverter, among other scenarios. Additionally, in some instances, adding combinational logic elements, such as LUTs functioning as inverters may enable moving registers across combinational logic elements during retiming to maintain the fixed power-up states and functionally equivalent behavior while improving performance of the circuit design. The retimer 15 may also perform costing by evaluating several possible initial states of retimed registers to maximize future retiming moves. For example, costing may refer to more favorably valuing combinations of logic elements and registers that may be merged during further retiming. The process 60 may also include generating (block 67) a bitstream representing the configuration of the final circuit design 18 to be implemented on the integrated circuit 16. In embodiments where an ASIC is used, the process 60 may include generating the ASIC design to be programmed on the integrated circuit 16.

Figure 4:
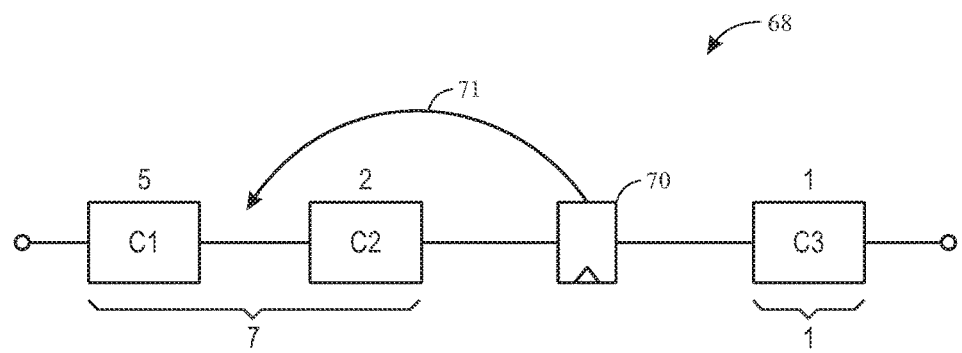
FIG. 4 illustrates an initial circuit design where the critical path has a delay of 7, in accordance with an embodiment.
Figure 5:
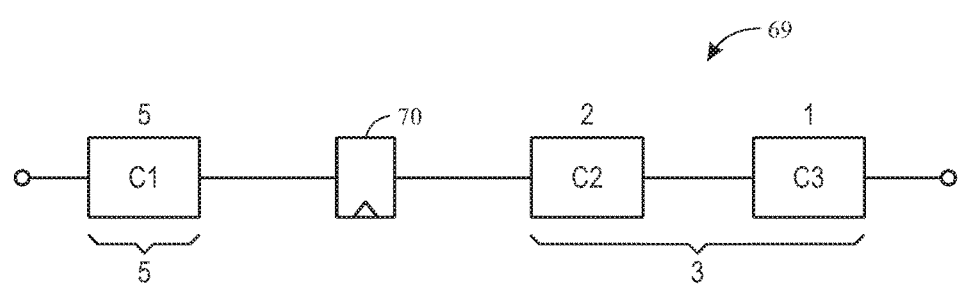
FIG. 5 illustrates a variation to the initial circuit design of FIG. 4 where a register is shifted that results in the critical path producing a delay of 5 after retiming, in accordance with an embodiment.

As discussed above, retiming may reduce the critical path—a logical path of the circuit design with the longest delay—by balancing the likely delays between the various paths of the circuit design. To that end, FIGS. 4 and 5 illustrate a simple example of retiming. In particular, FIG. 4 illustrates an initial circuit design 68 where a critical path includes a delay of some value (e.g., 7 units of time), and FIG. 5 illustrates a variation 69 to the initial circuit design of FIG. 4 where a register 70 is moved backwards across C2 that results in the critical path producing a delay of some lesser value (e.g., 5 units of time) after retiming.

As illustrated in FIG. 4, the critical path includes a first combinational element C1 that has a delay of 5 units of time and a second combination element C2 that has a delay of 2 units of time, which results in a total delay of 7 units of time. Another path includes just a third combinational element C3 with a delay of 1 unit of time. Thus, the retimer 15 may move register 70 backwards behind the second combinational element C2, as represented by arrow 71, to attempt to balance the delays between the paths. Once the register 70 is repositioned between the first combinational element C1 and the second combinational element C2, as shown in FIG. 5, the critical path delay is reduced to 5, which is produced by just the first combinational element C1, and a new path that includes the second combinational element C2 (delay of 2) and the third combinational element C3 (delay of 1) produces a combined delay of 3. As may be appreciated, registers may be moved forwards or backwards in an attempt to balance the delay between all pairs of registers in a circuit design, thus reducing the maximum delay and hence the cycle time.

When registers are moved across nodes with multiple fanins or fanouts, the same move is made across all fanins or all branches of the fanout to preserve functionality of the circuit. However, a retimed circuit design that forward moves a register to each respective branch of a fanout may not demonstrate the same sequential behavior as the first circuit design 14. That is, some initial states of retimed circuit designs can show different behavior than the first circuit design 14 for the same vector sequence.

Figure 6:
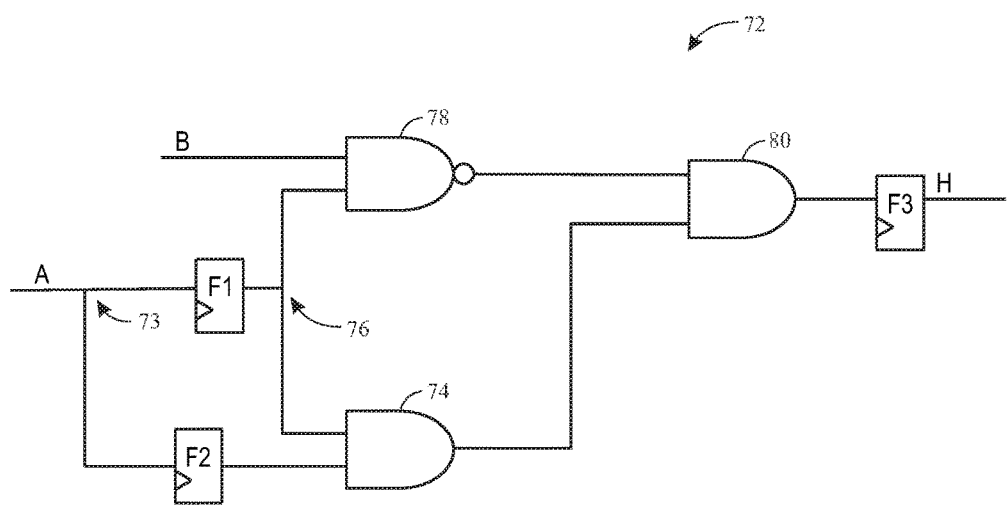
FIG. 6 illustrates an initial circuit design including a two-stage pipeline, in accordance with an embodiment.

For example, FIG. 6 illustrates an initial circuit design 72 including a two-stage pipeline, in accordance with an embodiment. The initial circuit design 72 includes two inputs, A and B. A datapath used by the input A includes a fanout 72 with two branches: a first branch includes register F1 and a second branch includes register F2. The branch including register F2 provides a first input to a first AND gate 74. The branch including register F1 includes another fanout 76 and one of its branches provides a second input to the first AND gate 74. A second branch from the fanout 76 provides a first input to a NAND gate 78 and the datapath used by the input B provides a second input to the NAND gate 78. Output from the first AND gate 74 and output from the NAND gate 78 are provided as two inputs to a second AND gate 80 that provides output H via a datapath that includes register F3.

The registers F1, F2, and F3 may be D flip-flops that track the inputs and a reset sequence (one vector) may be provided where input A equals 0 and input B equals 1. For all initial states, the reset sequence resets the circuit to state 0 for register F1, state 0 for register F2, state 0 for register F3, and an initial output state of 0 for H.

Figure 7:
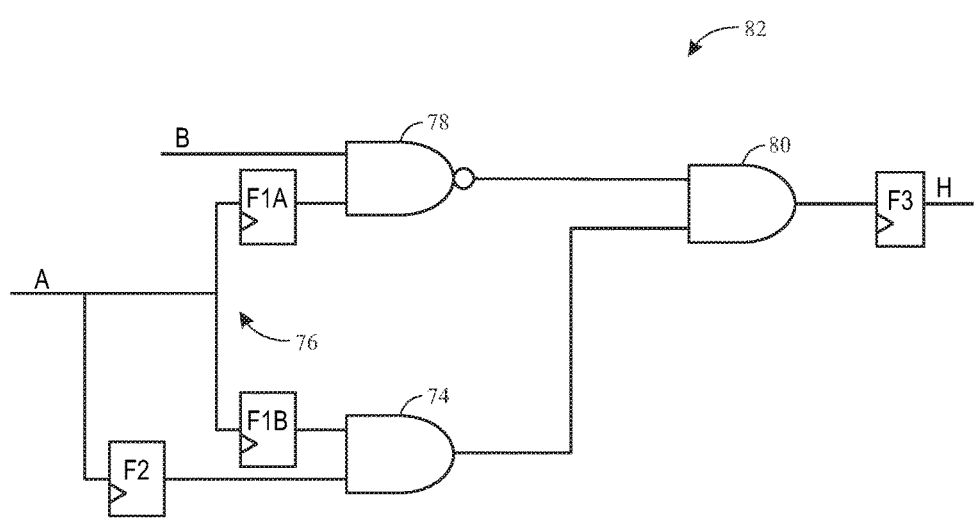
FIG. 7 illustrates a variation to the initial circuit design of FIG. 6 where a register has been forward retimed across a fanout, in accordance with an embodiment.

FIG. 7 illustrates a variation 82 to the initial circuit design 72 of FIG. 6 where the register F1 has been forward retimed across the fanout 76 into two identical registers F1A and F1B on respective fanout branches, in accordance with an embodiment. As depicted, the combinational logic elements (first and second AND Gates 74 and 80 and NAND gate 78) remain in the same positions and registers F2 and F3 remain in the same positions in the varied circuit design 82 as the initial circuit design 72. However, applying the same vector reset sequence of input A equals 0 and input B equals 1, the retimed varied circuit design 82 produces different sequential behavior than the initial circuit design 72. For example, for initial state, register F1A equals 0, register F1B equals 1, and register F2 equals 1, for the same vector reset sequence of input A equals 0 and input B equals 1, the varied circuit design 82 produces an output H of 1, as opposed to 0 output for H by the initial circuit design 72. Accordingly, to overcome the initial state conflict, some embodiments of the present disclosure include the retimer 15 programming all flip-flops to power-up in a logical 0 state.

Figure 8:
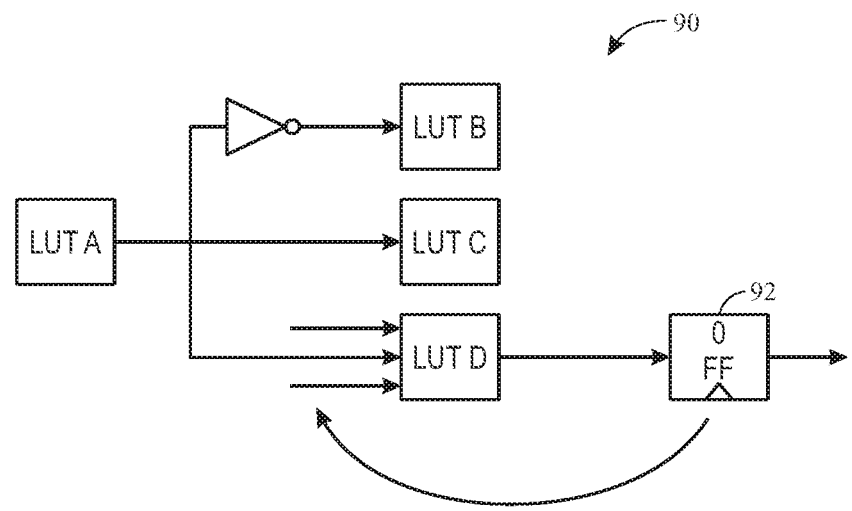
FIG. 8 illustrates an initial circuit design with a register having a fixed initial state of 0, in accordance with an embodiment.

FIG. 8 illustrates an initial circuit design 90 with a register 92 having a fixed initial state of 0, in accordance with an embodiment. As previously discussed, retiming may attempt to compute and maintain initial states while retiming across combinational logic and fanout branches. In the depicted example, the retimer 15 attempts to move the register 92 backwards across look-up table (LUT) D. It should be understood that the LUTs may be programmed to any complex boolean function that could be a combination of the functionality of combinational logic elements, such as AND gates, NAND gates, OR gates, NOR gates, XOR gates, inverters, and the like. For example, a LUT may be programmed as an AND gate to accept any 2 or more inputs (e.g., 3, 4, 5, 6) and output a single value by looking up which input values match with which output value. The following is a listing of input values and matching output values that would be programmed in a LUT functioning as an AND gate with 2 inputs: inputs of 1s match with output value of 1, inputs of 1 and 0 match with output value of 0, inputs of 0 and 1 match with output value of 0, and inputs of 0s match with output value of 0.

Figure 9:
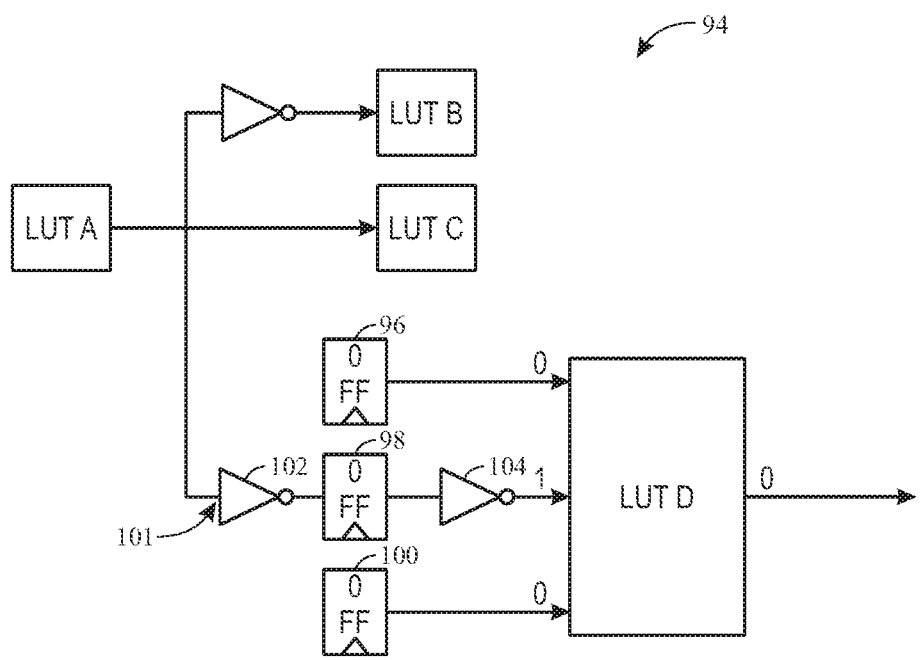
FIG. 9 illustrates a variation of the initial circuit design of FIG. 8 where the register is moved backwards across a combinational logic element and replicated with fixed initial states of 0, and inverters are added to a datapath of one of the replicated registers so the combinational logic element continues to produce a 0, in accordance with an embodiment.

LUT D includes 3 inputs, thus retiming backwards from the single output datapath of LUT D would involve replicating register 92 on each of the three respective input datapaths of LUT D. To illustrate, FIG. 9 illustrates a variation 94 of the initial circuit design 90 of FIG. 8 where the register 92 is moved backwards across the LUT D and replicated as registers 96, 98, and 100 on the three respective input datapaths to LUT D. To ensure the functional equivalence between the varied circuit design 94 and the initial circuit design 90, the initial states of the registers on the inputs of LUT D in the retimed circuit should continue to produce an output value of 0 after the backward retiming move. Further, the registers 96, 98, and 100 may be fixed to state 0, based on the architecture of the IC being designed. As such, in some embodiments, to ensure the LUT D (assuming LUT D is programmed to represent an AND gate) produces an output of 0, the retimer 15 may consider various input combinations to LUT D that may further retiming. For example, the retimer 15 may determine that the datapath including register 98 should input a 1 to the LUT D while the datapaths including the registers 96 and 100 should input a 0 to LUT D to maintain the output of 0 from LUT D and furthering future retiming moves. In other embodiments, the boolean function of LUT D itself may require that to produce a 0 value on the output of LUT D upon power-up, the input registers 96 and 100 should have an initial state of 0, and register 98 should have an initial state of 1.

As such, the retimer 15 may add combinational logic elements to the datapath including the register 98. As depicted, the retimer 15 added a first inverter 102 before the register 98 on fanout branch 101 including the register 98 and added a second inverter 104 after the register 98 on the same fanout branch 101 as the register 98. The first and second inverters 102 and 104 may ensure that the register 98 maintains the fixed initial state of 0, yet allowing to produce a value of 0 on the output of LUT D upon power-up. Further, the second inverter 104 may invert the state of 0 of the register 98 to 1 to input to the LUT D, while the registers 96 and 100 input 0's to the LUTD, thereby enabling the LUT D to produce the same initial output state of 0. As a result, the backwards retiming move may be properly performed by using fixed power-up states and adding combinational logic to ensure functional equivalence between varied circuit designs and the initial circuit designs. It should also be noted that the inverter 104 may also be absorbed into LUT D itself, by reprogramming the boolean function of LUT D. That is, the LUT may be reprogrammed to include the functionality of the inverter. For example, instead of using two LUTs for an AND gate and an inverter, the LUT functioning as an AND gate may be reprogrammed to absorb the functionality of the inverter, thereby functioning as a NAND gate. This may reduce the overall count of the LUTs.

Figure 10:
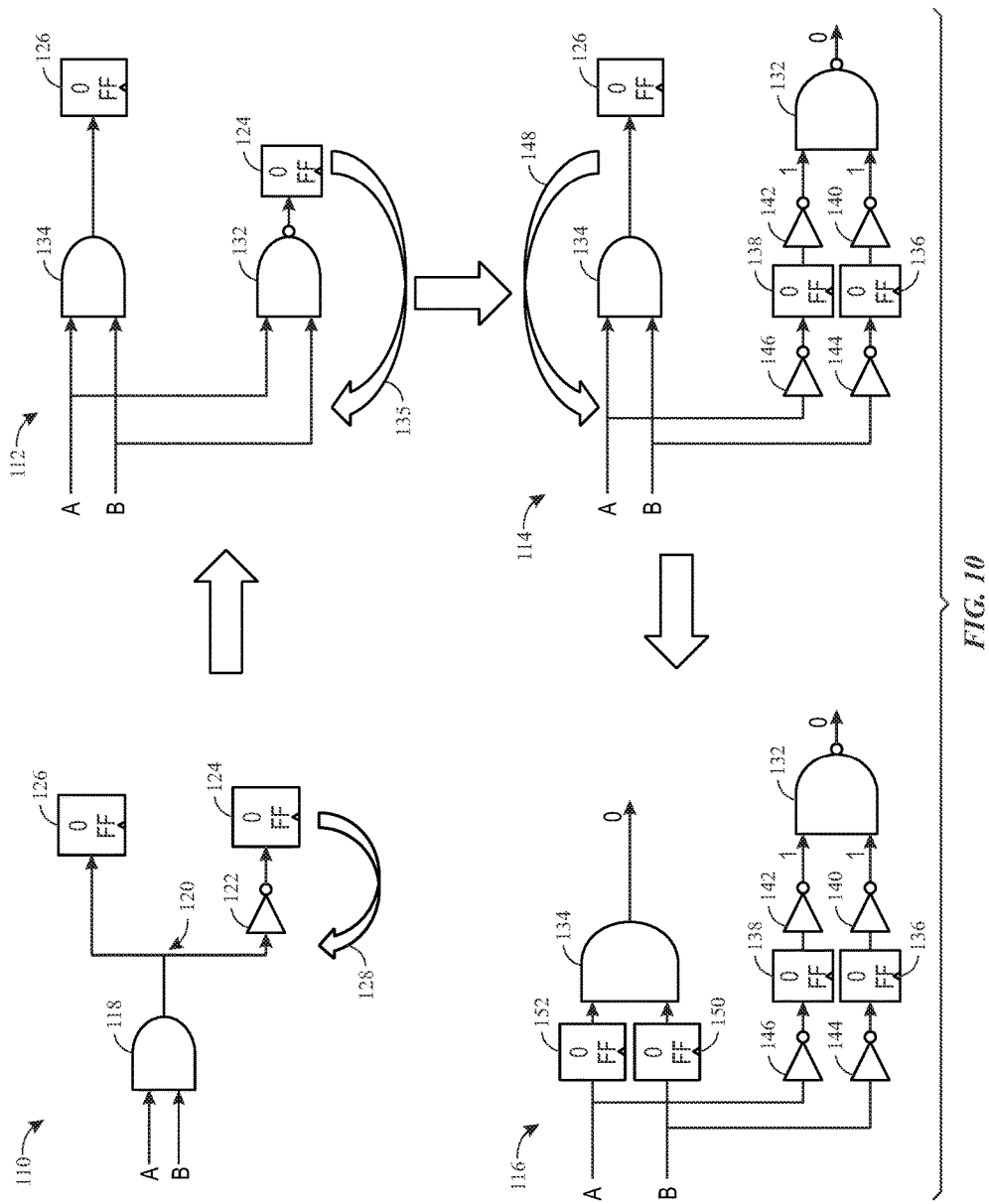
FIG. 10 illustrates an initial circuit design and variations to the initial circuit design generated during retiming that include registers with fixed power-up states, duplicated combinational logic elements, and/or added combinational logic elements, in accordance with an embodiment.

FIG. 10 illustrates an initial circuit design 110 and variations 112, 114, and 116 to the initial circuit design 110 generated during retiming that include registers with fixed power-up states, duplicated combinational logic elements, and/or added combinational logic elements, in accordance with an embodiment. The initial circuit design 110 includes two inputs A and B to combinational logic element 118, which is implemented as a LUT functioning as an AND gate. The LUT 118 outputs a single value to a datapath that includes a fanout 120. A first branch includes a combinational logic element 122, which may be implemented as a LUT functioning as an inverter, and a first register 124. A second branch includes a second register 126. As depicted, the initial states for the registers 124 and 126 on the two different branches are fixed as 0.

The retimer 15 may attempt to move the register 124 backwards across the inverter 122 (as shown by arrow 128) to improve performance. Since all flip-flops have a fixed initial state of 0, the retimer 15 may determine that such a retiming move will not produce the same initial output state as the initial circuit design 110 because the LUT 122 functioning as an inverter would cause the 0 state of the register 124 to be inverted to an output state of 1, which differs from the output state of 0 from the initial circuit design 110.

It should be appreciated that, oftentimes, other retimers may stop retiming when a varied circuit design has conflicting initial state specifications, but here, the retimer 15 in some of the present embodiments may enable retiming to continue by duplicating the driver combinational logic element 118 (LUT functioning as an AND gate), as illustrated in the varied circuit design 112. In addition, the retimer 15 may combine the LUT 122 functioning as an inverter with the LUT 118 in one of the duplicated logic elements to preserve functional equivalence of the initial circuit design 110. As such, the varied circuit design 112 includes LUT 132 (functioning as a NAND gate after combining LUT 118 functioning as an AND gate and LUT 122 functioning as an inverter) and LUT 134 (functioning as an AND gate). Modifying the circuit by duplicating the driver LUT 118 into LUT 132 and LUT 134 during retiming may enable retiming to continue by maintaining functionally equivalent behavior and the fixed initial states of the registers 124 and 126. As depicted, the varied circuit design 112 functions equivalently to the initial circuit design 110 because the LUT 132 receives two inputs A and B and outputs a value to a datapath including the register 124. Also, the LUT 134 receives the same two inputs A and B and outputs a value to a datapath including the register 126.

The retimer 15 may continue retiming by moving the register 124 (shown by arrow 135) backwards across the LUT 132 and replicating the register 124 into registers 136 and 138, as depicted in varied circuit design 114. To ensure that the LUT 132 functioning as a NAND gate continues to produce an output state of 0 while maintaining the fixed power-up states of 0 for the registers 136 and 138, the retimer 15 may determine to add additional LUTs to the varied circuit design 114. For example, the LUT 132 functioning as a NAND gate outputs a 0 when two input values of 1 are received. However, the architecture of the integrated circuit may dictate that the registers 138 and 136 maintain a fixed power-up state of 0. As such, the retimer 15 may determine that inverters 140 and 142 are added after the registers 136 and 138, respectively, to ensure that the output state of 0 from the LUT 132 is maintained but states of 1 are input to the LUT 132 after inversion. In addition, the retimer 15 may add inverters 144 and 146 before the registers 136 and 138, respectively, to maintain functionally equivalent behavior as the initial circuit design 110.

Although the varied circuit designs 114 and 110 are functionally equivalent, duplicating the LUTs 132 and 134 and adding the LUTs 140, 142, 144, and 146 in the varied circuit design 112 separates the registers 126 and 124 from the same datapath and overcomes the inversion issue discussed above with respect to the initial circuit design 110. It should be noted that the varied circuit design 114 that includes duplicated logic, added logic, and uses fixed power-up state registers 138 and 136 provides the same initial output state of 0 and 0 after retiming as the initial circuit design 110. However, the varied circuit design 114 may provide improved performance over the initial circuit design 110.

The retimer 15 may attempt to improve performance further by continuing retiming independently on two branches of the varied circuit design 114 and moving the register 126 backwards across the LUT 134 (shown by arrow 148), as shown in varied circuit design 116. The varied circuit design 116 includes registers 150 and 152 that were replicated from the register 126 on respective input datapaths B and A. As depicted, the fixed power-up states of 0 for the registers 150 and 152 may be maintained because the inputs of 0 to the LUT 134 functioning as an AND gate outputs a state of 0, which is equivalent to the initial output state of the initial circuit design 110. It should be noted that there are several combinations of initial inputs to the LUT 134 functioning as an AND gate that will produce an output of 0. For example, initial inputs of 1 and 0 will result in the LUT 134 functioning as an AND gate outputting a 0, initial inputs of 0 and 1 will result in the LUT 134 functioning as an AND gate outputting a 0, and initial inputs of 0 and 0 will result in the LUT 134 functioning as an AND gate outputting a 0. Thus, the retimer 15 may determine the various combinations of initial inputs and logic resulting in those inputs and perform costing to determine which combination is desirable to improve performance while maintaining the fixed initial states of the registers 136, 138, 150, and 152 and maintaining functionally equivalent behavior as the initial circuit design 110.

Figure 11:
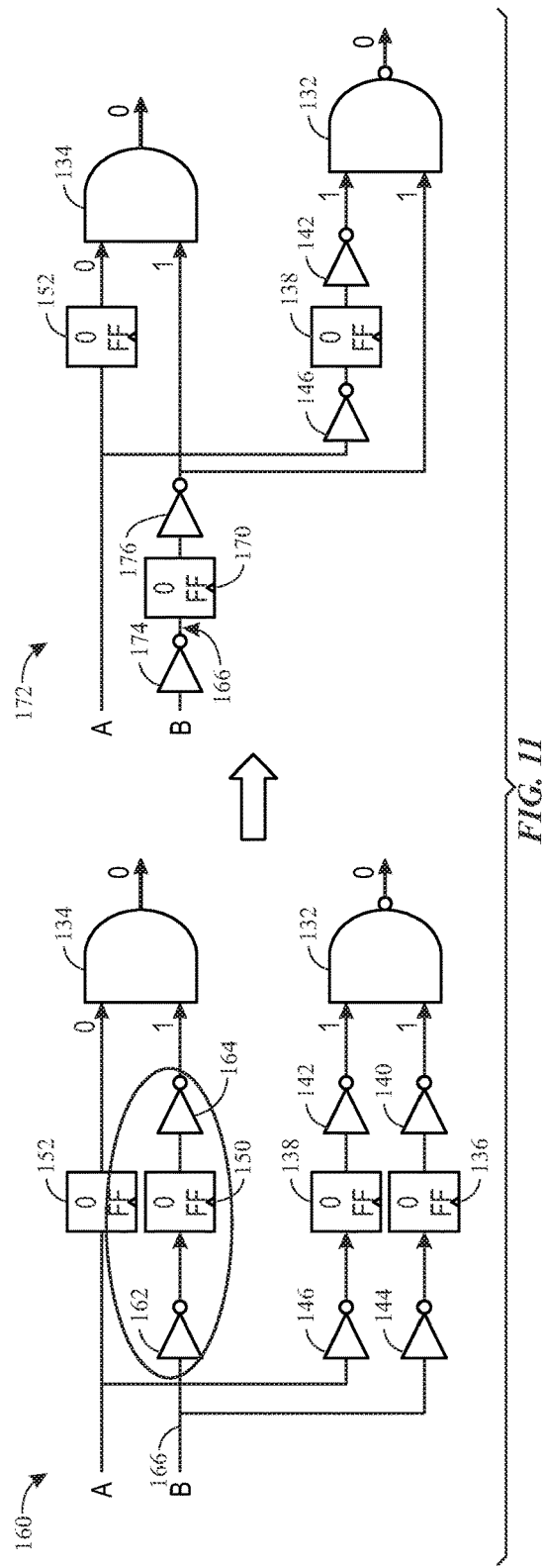
FIG. 11 illustrates the varied circuit design of FIG. 10 where combinational logic elements are added to a datapath including a register during retiming and costing is used between several possible initial power-up states to enable further retiming and improve circuit performance, in accordance with an embodiment.

Costing may refer to a process of associating a value with the combinations of initial inputs and the logic resulting in those initial inputs with look-ahead on critical inputs. The combination that has a better chance (e.g., higher likelihood) of future merging of registers and furthering backward retiming is provided with the more favorable value. As depicted in varied circuit design 160 in FIG. 11, the retimer 15 has determined that a combination of an input of 0 from datapath A and an input of 1 from datapath B has the most favorable likelihood of furthering retiming. As such, the retimer 15 has determined that adding LUT 164 functioning as an inverter after the register 150 will invert the fixed power-up state of 0 of the register 150 to 1, which is input on datapath B. Also, the retimer 15 may add LUT 162 functioning as an inverter before the register 150 to maintain functionally equivalent behavior of the varied circuit design 160. Further, such a configuration may be favorable because the highlighted logic (LUT functioning as an inverter 162, register 150, and LUT 164 functioning as an inverter; LUT 144 functioning as an inverter, register 136, and LUT 140 functioning as an inverter) can be merged onto fanout stem 166 to enable further backward retiming (without logic duplication).

Accordingly, the retimer 15 may continue retiming by merging the register 136 and the register 150 into register 170 on the fanout stem 166, merging the LUT 144 functioning as an inverter and the LUT 162 functioning as an inverter into LUT 174, which functions as an inverter, and merging the LUT 140 functioning as an inverter and the LUT 164 functioning as an inverter into LUT 176, which functions as an inverter. As depicted, the varied circuit design 172 maintains a fixed power-up state of 0 for the registers 138, 152, and 170 while maintaining functionally equivalent behavior as the initial circuit design 160. For example, the LUT 134 functioning as an AND gate receives a 0 from register 152 and a 1 from the LUT 176 functioning as an inverter and outputs a 0, and the LUT 132 functioning as a NAND gate receives a 1 from the LUT 142 functioning as an inverter and a 1 from the LUT 176 functioning as an inverter and outputs a 0, thereby maintaining the initial output state of the initial circuit design 160.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A computer-implemented method, comprising:
performing retiming using a first circuit design to determine one or more variations to the first circuit design, wherein the first circuit design comprises a first set of registers with defined power-up states and one of the one or more variations comprises a second set of registers that correspond to the first set of registers;
maintaining fixed power-up states for the second set of registers in the one of the one or more variations, wherein the fixed power-up states for the second set of registers are equivalent to the defined power-up states of corresponding registers of the first set of registers of the first circuit design;
identifying one or more registers of the second set of registers that are involved in one or more unsuccessful retiming moves due to an initial state conflict; and
performing one or more mitigating actions to resolve the initial state conflict to enable retiming to continue with the one or more variations while maintaining functionally equivalent behavior as the first circuit design, wherein the one or more mitigating actions comprise duplicating or adding look-up tables that are reprogrammable to absorb functionality of other look-up tables to reduce an overall look-up table count in the one or more variations;
generating a bitstream representative of a second circuit design based on the one or more mitigating actions; and
programming an integrated circuit using the bitstream to implement the second circuit design on the integrated circuit.

2. The method of claim 1, wherein the look-up tables function as inverters.

3. The method of claim 1, wherein the one or more mitigating actions comprise selecting a combination of logic elements in the one or more variations from a plurality of combinations of logic elements that result in functionally equivalent behavior as the first circuit design.

4. The method of claim 3, wherein selecting comprises performing costing by assigning a value to each of the plurality of combinations, wherein the value is indicative of a likelihood to further retiming.

5. The method of claim 1, wherein the one or more unsuccessful retiming moves comprise moving the one or more registers of the first set of registers backwards across an inverter.

6. The method of claim 1, wherein the one or more mitigating actions comprise combining combinational logic elements in the one or more variations.

7. The method of claim 1, wherein functionally equivalent behavior comprises the one or more variations producing the same output states as the first circuit design.

8. The method of claim 1, wherein maintaining fixed power-up states for the second set of registers comprises deterministically powering-up the one or more registers in a fixed state.

9. The method of claim 1, wherein the one or more registers of the first set of registers and the second set of registers comprise flip-flops that can power-up to a fixed state.

10. A tangible, non-transitory, computer-readable medium, comprising instructions that, when executed by a processor, are configured to:
perform retiming using a first circuit design to determine one or more variations to the first circuit design;
identify one or more registers that are involved in one or more unsuccessful retiming moves due to an initial state conflict in the one or more variations;
perform one or more mitigating actions to resolve the initial state conflict to enable retiming to continue with the one or more variations while maintaining fixed power-up states for the one or more registers in the one or more variations and maintaining functionally equivalent behavior as the first circuit design, wherein the one or more mitigating actions comprise selecting a combination of logic elements in the one or more variations from a plurality of combinations of logic elements that each result in functionally equivalent behavior as the first circuit design by performing costing, wherein performing costing comprises assigning a value indicative of a likelihood to further retiming to each of the plurality of combinations;
generate a bitstream representative of a second circuit design based on the one or more mitigating actions; and
program an integrated circuit using the bitstream to implement the second circuit design on the integrated circuit.

11. The computer-readable medium of claim 10, wherein the one or more unsuccessful retiming moves comprise moving the one or more registers backwards across an inverter.

12. The computer-readable medium of claim 10, wherein the one or more mitigating actions comprise duplicating combinational logic elements in the one or more variations, combining combinational logic elements in the one or more variations, adding combinational logic elements to the one or more variations, or some combination thereof.

13. The computer-readable medium of claim 12, wherein the combinational logic elements that are added comprise look-up tables that function as inverters, and wherein the combinational logic elements that are duplicated comprise driver look-up tables.

14. The computer-readable medium of claim 10, wherein the integrated circuit comprises a programmable logic device or an application-specific integrated circuit.

15. A design implementation component executed in a processor, comprising:
a retimer that:
performs retiming using a first circuit design to determine one or more variations to the first circuit design;
identifies one or more registers that are involved in one or more unsuccessful retiming moves due to an initial state conflict in the one or more variations; and
performs one or more mitigating actions to resolve the initial state conflict to enable retiming to continue with the one or more variations while maintaining fixed power-up states for the one or more registers in the one or more variations and maintaining functionally equivalent behavior as the first circuit design, wherein the one or more mitigating actions comprise duplicating or adding look-up tables that are reprogrammable to absorb functionality of other look-up tables to reduce an overall look-up table count in the one or more variations;
wherein the design implementation component is configured to generate a bitstream representative of a second circuit design based on the one or more mitigating actions, wherein the bitstream is configured to be programmed onto an integrated circuit to implement the second circuit design on the integrated circuit.

16. The design implementation component of claim 15, wherein the one or more unsuccessful retiming moves comprise moving the one or more registers backwards across an inverter.

17. The design implementation component of claim 15, wherein the one or more mitigating actions comprise duplicating one or more combinational logic elements in the one or more variations, combining combinational logic elements in the one or more variations, adding one or more combinational logic elements to the one or more variations, or some combination thereof.

18. The design implementation component of claim 17, wherein the one or more mitigating actions comprise adding a first look-up table that functions as an inverter after a moved register and adding a second look-up table that functions as an inverter before the moved register.

19. The design implementation component of claim 15, wherein the one or more mitigating actions comprise selecting a combination of logic elements in the one or more variations from a plurality of combinations of logic elements that each result in functionally equivalent behavior as the first circuit design by performing costing, wherein performing costing comprises assigning a value indicative of a likelihood to further retiming to each of the plurality of combinations.

20. The design implementation component of claim 15, wherein the integrated circuit comprises a programmable logic device or an application-specific integrated circuit.

* * * * *